(12) United States Patent
Haerle et al.

(10) Patent No.: US 7,727,919 B2
(45) Date of Patent: Jun. 1, 2010

(54) HIGH RESISTIVITY SILICON CARBIDE

(75) Inventors: Andrew G. Haerle, Sutton, MA (US); Edward A. Perry, Lunenburg, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 185 days.

(21) Appl. No.: 11/927,326

(22) Filed: Oct. 29, 2007

(65) Prior Publication Data
US 2009/0111678 A1  Apr. 30, 2009

(51) Int. Cl.
*C04B 35/565* (2006.01)
(52) U.S. Cl. .......................................... 501/88; 501/92
(58) Field of Classification Search .................. 501/88, 501/92
See application file for complete search history.

(56) References Cited

U.S. PATENT DOCUMENTS

| | | | |
|---|---|---|---|
| 3,951,587 A | 4/1976 | Alliegro et al. | |
| 4,561,891 A | 12/1985 | Maeda et al. | |
| 4,701,427 A | 10/1987 | Boecker et al. | |
| 5,011,639 A | 4/1991 | Urasato et al. | |
| 5,770,324 A * | 6/1998 | Holmes et al. | 428/688 |
| 7,166,523 B2 | 1/2007 | Nagasawa | |
| 2002/0155054 A1 * | 10/2002 | Aihara et al. | 423/345 |
| 2005/0148455 A1 * | 7/2005 | Narendar et al. | 501/88 |
| 2006/0091402 A1 | 5/2006 | Shiomi et al. | |

FOREIGN PATENT DOCUMENTS

| | | |
|---|---|---|
| EP | 0251218 A | 1/1988 |
| EP | 0967189 A1 | 12/1999 |
| EP | 0885858 B1 | 11/2003 |
| JP | 2005314217 A2 | 11/2005 |
| WO | 9736843 | 10/1997 |

OTHER PUBLICATIONS

Storm, R., "Processing of Sintered Alpha SiC," The American Society of Mechanical Engineers, Carborundum Company, Advanced Materials Division, Niagara Falls, NY (Abstract Only).

Storm, R. et al., "Sintered Alpha Silicon Carbide Ceramics for High Temperature Structural Application: Status Review and Recent Developments," The American Society of Mechanical Engineers, Schio Engineered Materials Company, Niagara Falls, NY, 1985 (Abstract Only).

* cited by examiner

*Primary Examiner*—Karl E Group
(74) *Attorney, Agent, or Firm*—Larson Newman & Abel, LLP; Thomas G. Field

(57) ABSTRACT

A recrystallized silicon carbide body is provided that has a resistivity of not less than about $1\text{E}5\ \Omega$ cm and a nitrogen content comprising nitrogen atoms bonded within the body, wherein the nitrogen content is not greater than about 200 ppm.

8 Claims, 2 Drawing Sheets

101 — Combining Coarse Silicon Carbide Particles with Fine Silicon Carbide Particles to Form a Mixture 103 — Shaping the Mixture to Form a Green Article 105 — Heating the Green Article to A Sublimation Temperature to Form a Recrystallized Silicon Carbide Body

HIGH RESISTIVITY SILICON CARBIDE

CROSS-REFERENCE TO RELATED APPLICATION(S)

BACKGROUND

1. Field of the Disclosure

The present disclosure is generally directed to silicon carbide bodies, and particularly directed to recrystallized silicon carbide bodies having a high electrical resistivity.

2. Description of the Related Art

The semiconductor device industry continues to move forward at a quickening pace driven by the need to produce smaller devices, particularly driven by the need to produce more devices per wafer. This has lead to the continued development of smaller devices produced on larger wafers, which naturally allows for a greater number of devices per wafer and thus increased production. In addition to the movement towards processing of devices on larger wafers, some industries are moving away from batch processing to single wafer processing (SWP) technologies. Many fabricators have found that a change from batch processing to single wafer processing enables improved control of the devices made on each wafer. Moreover, a change from batch processing to SWP notably reduces wafer-to-wafer variations. Accordingly, because processing control is essential when forming nanometer sized layers required for state of the art devices, SWP enables fabricators to improve their production. Additionally, because only one wafer is processed at a time, the scalability of the process is improved over batch processing platforms and therefore allows fabricators more flexibility in processing wafers of increasing size.

Providers of these platforms are continuously searching for components that will improve the capabilities of the SWP platforms. Accordingly, such components would have improved physical and chemical characteristics, as well as durability and compatibility with other components and the wafers being processed. As such, the industry, and particularly the SWP industry, continues to demand improved components and materials for incorporation into SWP platforms.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
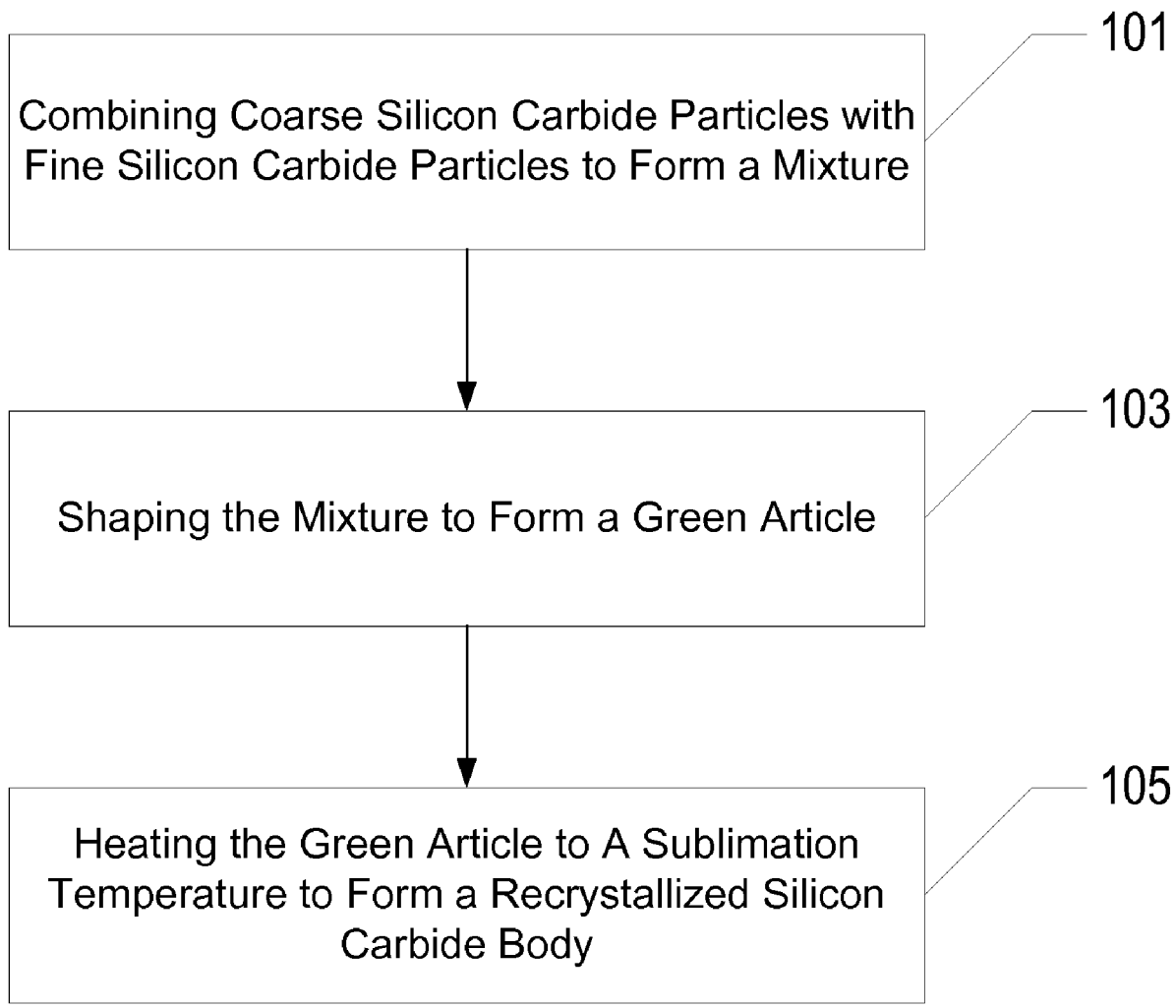
FIG. 1 is a flow chart illustrating a process for forming a recrystallized silicon carbide body according to one embodiment.

Referring to FIG. 1, a flow chart is illustrated that provides a process for forming a recrystallized silicon carbide body according to one embodiment. The process is initiated at step 101, by combining coarse silicon carbide particles with fine silicon carbide particles to form a mixture. Typically, these coarse and fine silicon carbide particles are combined in a dry form, such as a powder, to form a dry mixture. However, as will be described herein, the dry mixture can be made into a wet mixture such as a slurry. The formation of a mixture having a bimodal particles size distribution or even trimodal particle size distribution facilitates the formation of a silicon carbide body via a recrystallization process.

In reference to the average particle sizes of the silicon carbide particles, generally the coarse silicon carbide particles have an average particle size of not less than about 30 microns. In one embodiment, the average particle size of the coarse silicon carbide particles is greater, such as not less than about 40 microns, or not less than about 60 microns, or even not less than about 70 microns. Still, the coarse silicon carbide particles have an average particle which generally does not exceed about 300 microns.

With respect to the average particle size of the fine silicon carbide particles, generally, the fine silicon carbide particles have an average particle size that is less than the average particle size of the coarse silicon carbide particles. In particular, the fine silicon carbide particles can have an average particle size that is not greater than about half of the average particle size of the coarse silicon carbide particles. According to one embodiment, the fine silicon carbide particles have an average particle size of not greater than about 15 microns. In another embodiment, the fine silicon particles have an average particle size of not greater than about 5 microns, such as not greater than about 2 microns, or even not greater than about 1 micron. Still, the average particle size of the fine silicon carbide particles is limited, such that the particles generally have an average size within a range between about 0.1 microns and about 10 microns.

In some embodiments coarse silicon carbide particles and fine silicon carbide particles can be combined with intermediate-sized silicon carbide particles to form a trimodal mixture. Generally, the average particle size of intermediate-sized silicon carbide particles is less than about 200 microns, and more typically less than about 100 microns. In the context of trimodal mixtures, the intermediate-sized silicon carbide particles may have a smaller average particle size, such as not greater than about 75 microns, or not greater than about 50 microns, or even not greater than about 25 microns. Still, in such trimodal mixtures the average particle size of intermediate-sized silicon carbide particles is generally not less than about 1 micron.

Generally, combining the coarse silicon carbide particles and fine silicon carbide particles includes combining the particles using particular amounts of each of the fine and coarse grained components. As such, generally, the mixture includes not less than about 10 wt % coarse silicon carbide particles. Other embodiments utilize a greater content of coarse particles, such that the mixture includes not less than about 30 wt %, or not less than about 50 wt %, or even not less than about 75 wt % coarse silicon carbide particles. Still, the amount of coarse silicon carbide particles within the mixture is generally not greater than about 80 wt %, and is particularly within a range between about 20 wt % and about 70 wt %.

Accordingly, the amount of fine silicon carbide particles within the mixture is generally not less than about 10 wt %, and more particularly not less than about 30 wt %. Other embodiments utilize a greater content of fine silicon carbide particles within the mixture, such as not less than about 50 wt %, or not less than about 75 wt %. Typically, the mixture includes not greater than about 80 wt % fine silicon carbide particles, and particularly within a range between about 20 wt % and about 70 wt %.

In the context of trimodal mixtures, a percentage of intermediate-sized silicon carbide particles can be added to the mixture. The content of intermediate-sized silicon carbide particles in such mixtures is generally not less than about 10 wt %. Other embodiments utilize a greater content of such intermediate-sized particles, such as not less than about 20 wt %, or not less than about 40 wt %. Typically, a trimodal mixture will not include greater than about 75 wt % of an intermediate-sized silicon carbide particle.

In further reference to the coarse and fine silicon carbide particles, such particles are typically obtained such that the silicon carbide material has a low content of impurities, particularly free of metal elements. As such, the purity of the silicon carbide material is generally not less than about 97% pure silicon carbide, or even not less than about 99.9% pure silicon carbide. According to one particular embodiment, the purity of the silicon carbide particles is not less than about 99.99% pure silicon carbide.

The combination of the fine and coarse silicon carbide particles can include combining such particles in either a dry mixture or a wet mixture. According to one embodiment, combining the coarse and the fine silicon carbide particles includes formation of a wet mixture, or a slurry. The formation of a slurry can facilitate certain formation processes, for example a slip casting process. As such, the slurry includes the fine and coarse particles, and potentially intermediate particles, in a liquid carrier, which may be an organic or inorganic material. According to one embodiment, the liquid carrier is aqueous, that is the slurry includes the dry mixture of silicon carbide particles combined with water. Notably, the slurry can include other additives besides the liquid carrier, including organic or inorganic compounds that facilitate suitable slurry rheology and chemistry, such as, for example, surfactants and binders.

In further reference to forming a wet mixture, the percentage of dry components within the slurry, which can include the coarse and fine silicon carbide particles, generally is not greater than 50 wt % of the total weight of the slurry. According to a particular embodiment, the percentage of dry components within the slurry is not greater than 40 wt %, such as not greater than about 30 wt %, or not greater than about 20 wt %. Accordingly, the percentage of dry components within the slurry is typically not less than about 5 wt %. As such, the amount of liquid carrier within the slurry is generally not less than about 10 wt %. In one embodiment, the amount of liquid carrier within the slurry is not less than about 30 wt %, such as not less than about 50 wt %, or even not less than about 75 wt %. Generally, the amount of liquid carrier within the slurry is within a range between about 20 wt % and about 80 wt %.

The process continues at step 103 by shaping the mixture to form a green article. Generally, the shaping process can include processes such as casting, molding, extruding, pressing, or combinations thereof. The shaping process is determined in part by the type of mixture formed, that is, a wet or dry mixture. According to a particular embodiment, the shaping process includes a casting process, and more particularly, a slip casting process, wherein the slurry containing the coarse and fine silicon carbide particles, if not also intermediate sized particles, is poured into a mold and cast to form a green article having a particular contour.

After shaping the mixture to form a green article, the process typically includes a drying process to give the green article suitable strength. The drying process can include exposing the green article to elevated temperatures in a reduced humidity atmosphere. Drying the green article typically includes drying the green article at a temperature which may be greater than room temperature (22° C.), but is typically less than about 200° C., or in some instances at a temperature of less than about 100° C. Typically, the duration of drying is less than about 2 days, such as less than one day, or even less than about 12 hours.

During a drying process, the green silicon carbide article can undergo some linear shrinkage, however such shrinkage can be minimal as compared to other forming methods. Generally, the amount of linear shrinkage is not greater than 5%. Other embodiments may have less shrinkage, such as not greater than about 3%, or even not greater than about 1%.

Referring again to FIG. 1 after forming the green article at step 103, the process continues at step 105 by heating the green article to a sublimation temperature to form a recrystallized silicon carbide (ReSiC) body. As used herein, the term "heating," particularly in the context of the sublimation temperature, refers to a temperature of heating at which the fine silicon carbide particles sublimate to a gaseous state and after which, recrystallize on the coarse silicon carbide particles to form a ReSiC body. Generally, the sublimation temperature is typically greater than about 1700° C. According to one embodiment, the sublimation temperature is greater than about 1800° C., such as greater than about 1900° C., or even greater than about 2000° C. Typically, the sublimation temperature is not greater than about 2500° C.

During heating of the green article, the process can be carried out in a reduced pressure atmosphere that facilitates sublimation. As such, the atmosphere generally has a pressure of not greater than about 25 Torr. According to another embodiment, heating is carried out at a pressure of not greater than about 20 Torr, such as not greater than about 15 Torr, or even not greater than about 10 Torr. As such, the pressure is typically within a range between about 4 Torr and about 15 Torr, and more particularly within a range between about 4 Torr and about 12 Torr.

In further reference to the atmosphere, typically, the atmosphere during heating contains a gas or mixture of gases that is different than normal atmospheric gases. That is, the normal atmosphere can be purged before the heating process and replaced with suitable gases. Particularly suitable gases include inert gas or combination of inert gases, or more particularly noble gases. According to one particular embodiment, the atmosphere during heating includes argon, such that not less than about 90 vol % of the atmosphere is argon.

Moreover, in addition to providing an atmosphere comprising suitable gases, such as inert gas, such gases may be flowed through the chamber during heating. According to a particular embodiment, the inert gas can be flowed through the chamber at a rate of not less than about 2 standard liters per minute (SLPM) wherein the furnace has a volume of not less than about 1 m$^3$, and in a more particular embodiment is 1.25 m$^3$ (52 inches in diameter and 36 inches deep). In another embodiment, the flow is greater, such as not less than about 4 SLPM, or not less than about 6 SLPM, or even not less than about 8 SLPM. Generally, higher flow rates of the inert gas improve the processing conditions. Yet, according to one particular embodiment, the flow rate is not greater than about 20 SLPM for a furnace having a volume of approximately 1.25 m$^3$.

In particular, during heating, the atmosphere contains a reduced nitrogen content. According to one embodiment, the content of nitrogen within the chamber is reduced such that the concentration of nitrogen is not greater than about 15 ppm. Other embodiments may utilize a lesser concentration of nitrogen, such as not greater than about 12 ppm, or not greater than about 10 ppm, or even not greater than about 8 ppm. Generally, lower concentrations of nitrogen in the atmosphere enhance the processing conditions and formation of a suitable article. Yet, in one particular embodiment, the nitrogen concentration is not less than about 1 ppm.

Typically, the heating process is carried out for a duration of not less than about 30 minutes at the sublimation temperature. According to one embodiment, heating at the sublimation temperature is carried out for a duration of not less than about one hour, such as not less than about 4 hours, or even not less than about 8 hours. Embodiments herein utilize a duration of heating at the sublimation temperature typically within a range between about 1 hour and 8 hours, and typically not greater than about 12 hours.

During heating to form a recrystallized SiC body, the body undergoes a small amount of linear shrinkage. The small degree of linear shrinkage facilitates the formation of near net-shaped articles and reduces the post-processing forming and machining operations. Generally, the linear shrinkage is not greater than about 3%. In fact, the linear shrinkage of the ReSiC body during heating can be less, such as not greater than about 2%, not greater than about 1% or even not greater than about 0.5%. Typically, the linear shrinkage of the ReSiC body during heating is within a range between about 0.1% and about 3%.

The recrystallized silicon carbide body formed via the process outlined in FIG. 1 is a high-resistivity recrystallized silicon carbide body. That is, the ReSiC body has a resistivity of not less than about 1E5 Ω cm at 300K. In one particular embodiment, the resistivity of the ReSiC body is not less than about 1E6 Ω cm, such as not less than about 1E7 Ω cm, or even not less than about 1E8 Ω cm (at 300K). Generally, the resistivity of the ReSiC body is within a range between about 1E5 Ω cm and about 1E12 Ω cm (at 300K). And more particularly within a range of between 1E7 Ω cm and about 1E11 Ω cm (at 300K). It will be appreciated that all such resistivity values provided herein were obtained based on ASTM 4496.

In further reference to the ReSiC body formed according to the process provided in FIG. 1, typically, the ReSiC body has a nitrogen content within the body of not greater than 200 ppm. As used herein, the term "nitrogen content" refers to a content of nitrogen atoms that are bonded (e.g., covalently bonded) within the ReSiC body. As provided above, the nitrogen content of the ReSiC body is generally not greater than about 200 ppm, and even not greater than about 150 ppm. According to a particular embodiment, the ReSiC body has a lower nitrogen content, such as not greater than about 100 ppm, or not greater than about 75 ppm, or even not greater than about 50 ppm. The nitrogen content is typically within a range between about 1 ppm and about 150 ppm.

The ReSiC body generally has a polycrystalline structure, comprising multiple grains. Generally, the average grain size of the silicon carbide grains within the ReSiC body is not less than about 0.5 microns. Still, other embodiments utilize a polycrystalline body having larger grains, such that the average grain size is not less than about 50 microns, or not less than about 75 microns, or even not less than about 100 microns. Typically the average grain size is within a range between about 20 microns and about 200 microns.

The ReSiC body generally has porous content comprising open and closed pores. As such, the ReSiC body typically has a porosity of not less than about 5 vol % of the entire volume of the body. In one embodiment, the porosity is not less than about 8 vol %, such as not less than about 10 vol % or even not less than about 12 vol %. Typically, the porosity of the ReSiC body is within a range between about 5 vol % and about 25 vol %, and typically, the porosity is not greater than about 50 vol %.

Moreover, the ReSiC body can have a particular density, such as not greater than about 2.9 g/cc. In another embodiment, the density is less, such as not greater than about 2.8 g/cc, or even not greater than about 2.7 g/cc.

In further reference to the formed recrystallized article, the ReSiC body typically has a thermal conductivity of not greater than about 30 Watts/mK. According to one embodiment, the ReSiC body has a thermal conductivity of not greater than about 28 Watts/mK, such as not greater than about 26 Watts/mK. Typically, the ReSiC body has a thermal conductivity within a range between about 20 Watts/mK and about 26 Watts/mK.

With regard to mechanical properties of the ReSiC body, suitable mechanical properties facilitate the use of the ReSiC body in certain applications. Generally the modulus or rupture (MOR) of the ReSiC body is not greater than about 300 MPa. Particularly, the ReSiC body generally has a MOR of not greater than about 250 MPa, such as not greater than about 225 MPa, or even not greater than about 150 MPa. According to one embodiment, the ReSiC body has a MOR within a range of between 100 MPa and about 200 MPa, and more particularly within a range of 100 MPa and 150 MPa.

Additionally, the ReSiC body can have a modulus of elasticity (MOE) of not greater than about 350 GPa. According to one embodiment, the MOE of the ReSiC body is not greater than about 325 GPa, such as not greater than about 300 GPa, or even not greater than about 250 GPa. In one embodiment, the MOE of the ReSiC body is within a range between about 200 GPa and about 250 GPa.

The thermal expansion coefficient (CTE) of the ReSiC body is typically not less than about $4.2 \times 10^{-6}/°$ C. According to other embodiments, the CTE of the ReSiC body can be greater, such as not less than about $4.5 \times 10^{-6}/°$ C. or even not less than about $4.7 \times 10^{-6}/°$ C. Generally, the CTE of the ReSiC body is less than $5 \times 10^{-6}/°$ C., and more particularly within a range between about $4.5 \times 10^{-6}/°$ C. and about $4.9 \times 10^{-6}/°$ C.

In further reference to the ReSiC body formed according to the process provided in FIG. 1, the body generally comprises a low content of particular metal species. According to a particular embodiment, the aluminum content of aluminum atoms bonded within the ReSiC body is not greater than about 200 ppm. In particular, the aluminum content can be less, such as not greater than about 100 ppm, not greater than about 50 ppm, or even not greater than about 25 ppm. Typically, the aluminum content within the ReSiC body is within a range between about 5 ppm and about 200 ppm.

According to the process of FIG. 1, the boron content within the ReSiC body is generally low, such as not greater than about 50 ppm. Other ReSiC bodies can have less boron, such as not greater than about 40 ppm, not greater than about 30 ppm, or even not less than about 20 ppm. The boron content of ReSiC bodies formed according to the process of FIG. 1 is typically within a range between 1 ppm and about 50 ppm.

The ReSiC body can have dimensions suitable for particular applications such as wafer support articles for use in a single wafer processing device. As such, the ReSiC body has dimensions of length, width, and thickness. Particularly, the relationship between these dimensions is as follows: length≧width≧thickness, and more particularly the width is oftentimes greater than the thickness. For articles formed according to the process provided in FIG. 1, generally the thickness of such ReSiC bodies is not greater than about 30 mm. More particularly, the thickness of such recrystallized silicon carbide bodies is generally not greater than about 20 mm. Such as not greater than about 15 mm, or even not greater than about 10 mm.

In addition, to the processes provided in FIG. 1, the process for forming a ReSiC body can further include forming a top portion overlying a portion of the ReSiC body. The top portion can include provision of a film or layer of material overlying the ReSiC body, and in particular, in direct contact with the ReSiC body. The top portion can facilitate mechanical stability, for example by improving the densification of the upper surface and reducing particle flaking and potential contamination of workpieces. The top portion can also provide enhanced chemical stability, particularly by reducing the presence of some elemental species that may contaminate workpieces in contact with the ReSiC body. The formation of a top portion can include providing a layer of material over a select surface of the ReSiC body, or alternatively over the majority of the body. As such, the top portion generally overlies not less than about 20% of the total surface area of the ReSiC body. According to other embodiments, the top portion can overlie a greater percentage of the surface area of the ReSiC body, such as not less than about 50%, or not less than about 80%, or even not less than 95%. According to one particular embodiment, the top portion overlies the entire available surface layer of the ReSiC body.

Formation of the top portion can include a deposition process, such as a thick film deposition process or a thin film deposition process. Suitable thin film deposition processes can include for example, a vapor deposition process, such as chemical vapor deposition (CVD) or, alternatively, a spraying process. According to one particular embodiment, the spraying process can include a flame spraying process, and particularly, a plasma spraying process. Alternatively, the deposition process can include a sputtering process.

Generally, the top portion has an average thickness of not less than 10 microns. According to one embodiment, the average thickness of the top portion is not less than about 15 microns, such as not less than about 20 microns, not less than about 100 microns, or even not less than about 500 microns. Generally, the top portion has an average thickness within a range between about 10 microns and about 1 mm.

Additionally, the top portion can be a dense layer, generally having a porosity less than that of the ReSiC body. As such, the porosity of the top portion is generally not greater than about 5 vol %, such as not greater than about 3 vol % or even not greater than about 1 vol %. Notably, formation of a dense top portion can facilitate reduced particle generation.

Figure 2:
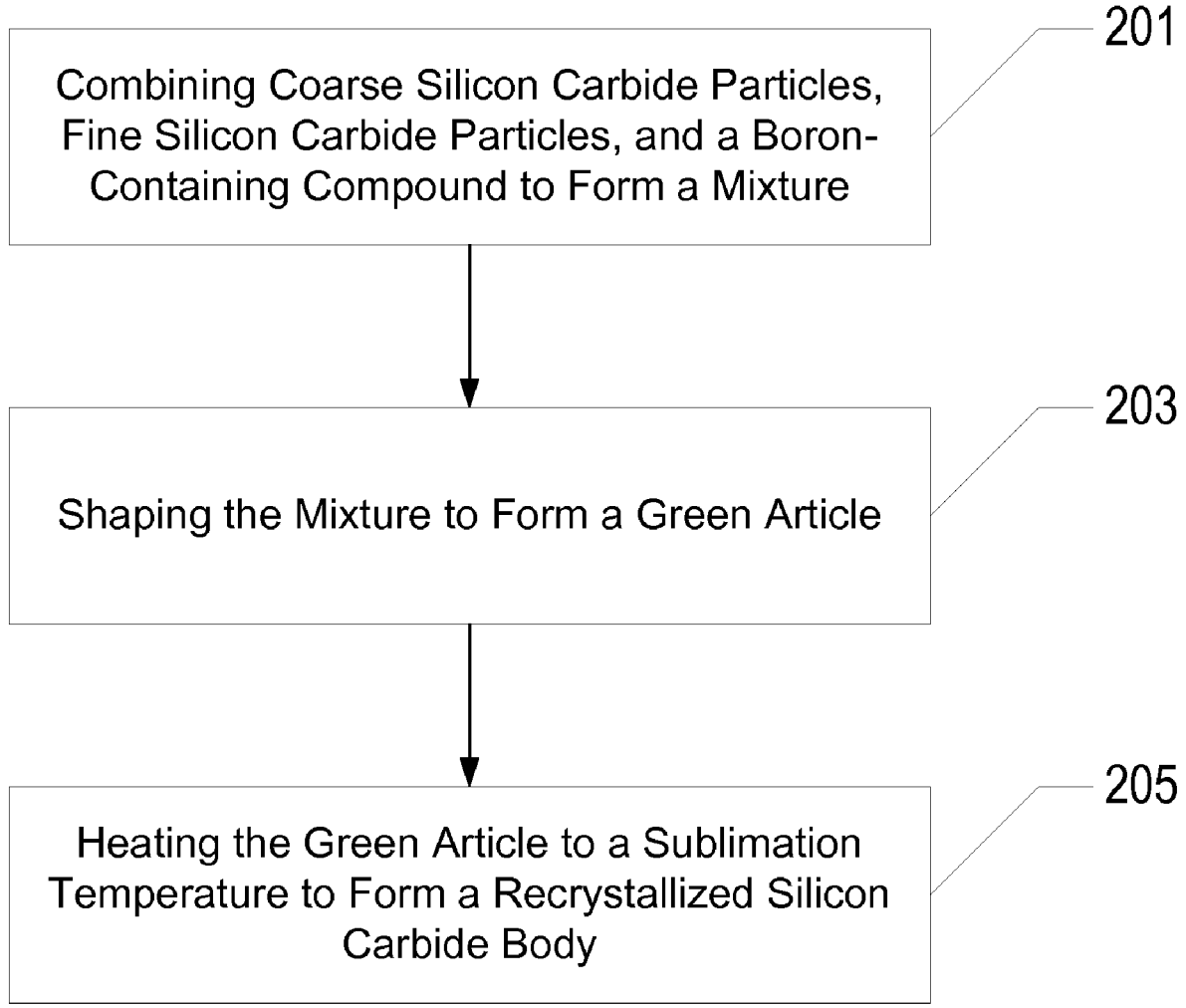
FIG. 2 is a flow chart illustrating a process for forming a recrystallized silicon carbide body according to one embodiment.

Referring to FIG. 2, a flow chart is provided that illustrates a process for forming a recrystallized silicon carbide body according to another embodiment. The process is initiated at step 201 by combining coarse silicon carbide particles, fine silicon carbide particles, and a boron-containing compound to form a mixture. In reference to the coarse silicon carbide particles and fine silicon carbide particles, the combination of these particles can include the same process parameters as outlined above in accordance with the embodiment provided in FIG. 1. Moreover, the coarse and fine silicon carbide particles in this embodiment can have the same characteristics as described above. It will also be appreciated, that such a mixture can include an intermediate-sized silicon carbide particle components such that a trimodal mixture can be formed as previously described.

The boron-containing compound is generally an inorganic material. According to a one embodiment, the boron-containing compound is a ceramic material, and particularly suitable ceramic materials can include materials such as boron carbide, boron nitride, boron oxide, borides, or combinations thereof. In one particular embodiment, the boron-containing compound is boron carbide. According to another particular embodiment, the boron-containing compound is boron nitride.

Generally, the boron-containing compound is present within the mixture in an amount of not greater than about 1 wt %, based upon a dry weight basis of the components within the mixture. In another embodiment, the amount of the boron-containing compound is not greater than about 0.5 wt %, such as not greater than about 0.1 wt %, or even not greater than about 0.05 wt %. It will be appreciated that the mixture can contain amounts of the fine and coarse silicon carbide particles as described above.

Notably, the mixture can be a wet mixture, such that the dry components including the coarse and fine silicon carbide particles and the boron-containing compound can be combined with a liquid carrier to form a slurry. The slurry may be formed according to parameters described herein.

Referring again to FIG. 2, after combining the particles in step 201, the process continues at step 203 which includes shaping the mixture to form a green article. Shaping of the green article can include such processes such as casting, molding, extruding and pressing, and combinations thereof. According to one particular embodiment, the green article is shaped via casting, and more particularly by a slip casting process. Notably, formation of the green article can also include a drying process as described previously.

After shaping the green article at step 203, the process continues at step 205 by heating the green article to a sublimation temperature to form a recrystallized silicon carbide body. Notably, according to this embodiment, formation of the recrystallized silicon carbide (ReSiC) body is done at a sublimation temperature which is typically not less than about 1800° C. According to another embodiment, the sublimation temperature is not less than about 1900° C. or not less than about 2000° C. Accordingly, the sublimation temperature for ReSiC body formed according to this embodiment is generally within a range between about 1900° C. and about 2500° C.

Heating is generally carried out in a reduced pressure atmosphere, such that the pressure within the chamber during heating is not greater than about 25 Torr. According to one particular embodiment, the pressure within the chamber during heating is not greater than about 20 Torr, such as not greater than about 15 Torr, not greater than about 10 Torr, or even not greater than about 8 Torr. Generally, the pressure within the chamber during heating is within a range between about 4 Torr and about 15 Torr.

Generally, heating is carried out for a duration of not less than about 30 minutes. In accordance with other embodiments provided herein, heating is generally carried out for a duration of not less than one hour, such as not less than about two hours, not less than about 4 hours, or even not less than about 8 hours. Generally, heating is carried out for a duration of between about 2 hours and about 8 hours, typically not greater than about 12 hours.

As such, during formation, particularly during heating of the ReSiC body, the body undergoes a slight linear shrinkage, such as not greater than about 5%, according to one embodiment, the linear shrinkage of the ReSiC body during heating is not greater than about 3%, such as not greater than about 2%, or even not greater than about 1%. Generally, the linear shrinkage of the ReSiC body during heating is small, such as within a range between about 0.1% and about 3%.

In reference to the properties of the silicon carbide article, the ReSiC body formed according to the process provided in FIG. 2 generally is a high resistivity silicon carbide body having a particular boron content. According to one embodiment, the resistivity of the ReSiC body is not less than about $1\mathrm{E}5 \, \Omega$ cm (at 300K). In one particular embodiment, the resistivity of the ReSiC body is not less than about $1\mathrm{E}6 \, \Omega$ cm, such as not less than about $1\mathrm{E}7 \, \Omega$ cm, or even not less than about $1\mathrm{E}8 \, \Omega$ cm (at 300K). Generally, the resistivity of the ReSiC body is within a range between about $1\mathrm{E}5 \, \Omega$ cm and about 1E12 Ω cm (at 300K), and more particularly within a range of between 1E7 Ω cm and about 1E11 Ω cm (at 300K).

Moreover, the ReSiC body formed according to the process provided in FIG. 2, has a particular boron content. As used herein, the term "boron content" describes the content of boron atoms within the recrystallized silicon carbide body that are bonded within the body. Notably, the boron content of the ReSiC body is not greater than about 500 ppm. According to one embodiment, the boron content is less such as not greater than about 400 ppm, such as not greater than 300 ppm, or not less than about 200 ppm. According to embodiments herein, the boron content is within a range between about 50 ppm and about 200 ppm, more particularly within a range between about 50 ppm and about 150 ppm.

The ReSiC body formed according to the process provided in FIG. 2 can have the same mechanical characteristics such as MOR, MOE, and CTE, as described above in accordance with the embodiments associated with FIG. 1. Additionally, the ReSiC body formed according to the process of FIG. 2 has the characteristics as those described above, notably the same porosity, shrinkage, density, thermal conductivity, and grain size as those previously disclosed in accordance with the ReSiC body formed according to the process provided in FIG. 1.

The ReSiC body can include dimensions of length, width, and thickness, which are generally related as follows: length≧width≧thickness. More particularly, the length is typically the longest dimension of the article formed, while the width is generally the second longest dimension and is generally greater than the thickness. The thickness is generally the shortest dimension and more typically less than the width. In one embodiment the thickness of the ReSiC body formed according to process provided in FIG. 2 is not less than about 5 mm. In fact, ReSiC bodies formed according to this process can include robust articles having greater thicknesses, such as not less than about 10 mm, such as not less than about 20 mm, or even not less than 30 mm. Generally, the articles formed according to the process provided above, have a thickness within a range between about 10 mm and about 100 mm.

Moreover, in addition to the formation of the recrystallized silicon carbide body, the process can include a top portion. Formation of a top portion can include processes and characteristics as provided in previous embodiments. The top portion can be formed by a deposition or infiltration process, and particularly may include an inorganic material, such as a carbide and particularly silicon carbide.

EXAMPLE 1

Table 1 is provided below which includes resistivities of Samples 1-11, which include samples of a recrystallized silicon carbide body. For each of the Samples, Table 1 provides the heating temperature, the starting materials, and notably heating environment, that is a "dynamic" or "static" environment during the sublimation/recrystallization reaction.

TABLE 1

| Sample | Starting Materials | Heating Conditions | Heating Temperature (Celsius) | Resistivity (Ohm-cm) |
|---|---|---|---|---|
| 1 | E280/E285/E300 | Dynamic | 1950 | 3.0E+07 |
| 2 | E280/GMF5C/E300 | Dynamic | 1950 | 1.0E+07 |
| 3 | GMF5C/E300 | Dynamic | 1950 | 6.0E+07 |
| 4 | GMF5C/E300 | Dynamic | 1950 | 7.0E+07 |
| 5 | GMF5C/E300 | Dynamic | 1950 | 1.0E+08 |
| 6 | E280/GMF5C/E300 | Dynamic | 1800 | 2.0E+06 |
| 7 | GMF5C/E300 | Dynamic | 2050 | 1.0E+07 |
| 8 | E280/E285/E300 | Static | 2050 | 2.7E+03 |
| 9 | E280/GMF5C/E300 | Static | 1950 | 3.0E+03 |
| 10 | GMF5C/E300 | Static | 1950 | 2.0E+04 |
| 11 | GMF5C/E300 | Static | 1950 | 3.6E+03 |

Generally, formation of each of the Samples is initiated by forming a mixture from particular starting materials. As provided in Table 1, the particular starting materials include a combination of fine-grained silicon carbide particles and coarse-grained silicon carbide particles, to achieve at least a bimodal distribution of particles. In some examples, a third type of silicon carbide particle is included to achieve a particular grain-size distribution. Accordingly, the E280, E285, and GMF5C starting materials are fine silicon carbide particles having an average particle size of approximately 3 microns. The E300 starting material is a coarse silicon carbide particle having an average particle size of approximately 100 microns. The mixture of fine SiC particles (E280 and E285) and the coarse SiC (E300) particles are combined such that the fine particles comprised 52 wt % of the mixture and the coarse particles comprised the remaining 48 wt %. When using two types of fine silicon carbide particles, such as E280 and E285, the combination includes equal percentages of both components, that is, 50 wt % of each of the total weight of the fine components, or 26 wt % of the total weight of the dry mixture.

An aqueous slurry is formed from each of the mixtures, and test samples are formed from each of the slurries via casting to form green articles. The green articles are heated to a sublimation/recrystallization temperature to form recrystallized silicon carbide samples having an average thickness of 5 mm. The sublimation/recrystallization temperatures for each of the Samples 1-11 is between 1800° C. and about 2050° C., and the samples are held at this temperature for 180 minutes. Notably, each of the Samples 1-11 are heated in a "dynamic" or "static" environment. The "dynamic" environment includes a reduced pressure atmosphere, on the order of 6 Torr, and a reduced partial pressure of nitrogen, typically on the order of 6 ppm, as well as a flow of an inert gas (e.g., Ar) through the heating chamber at a rate of approximately 8 Standard Liters per minute (SLPM) for a chamber having a volume of 1.25 m$^3$. The static environment includes a normal environment, including normal atmospheric pressure and normal concentrations of atmospheric gases. Each of Samples 1-11 have a porosity of 15 to 20 vol %.

As provided in Table 1, heating the samples in a dynamic environment provided recrystallized silicon carbide bodies having resistivities at least two orders of magnitude greater than samples in a static environment. The samples (Samples 1-7) formed in the dynamic environment had typical resistivities of around 1E7 Ω cm at 300K and resistivities as high as 1E8 Ω cm at 300K. While Samples 8-11 formed in the static environment had resistivities around 3E3 Ω cm at 300K. In most cases the difference in the resistivity between the samples formed in a dynamic environment versus the samples formed in a static environment, was four orders of magnitude. Generally, Table 1 demonstrates that formation of high resistivity recrystallized silicon carbide bodies is possible using particular combination of features and processes provided in embodiments herein.

EXAMPLE 2

Provided below is Table 2, which includes resistivities for Samples 1-12 which are formed using a boron doping technique, described in embodiments above. For each of the Samples, Table 2 provides the heating temperature, the starting materials, and notably the boron dopant level (boron content) within each of the samples.

TABLE 2

| Sample | Starting Materials | Boron Dopant Level (ppm) | Heating Temperature (Celsius) | Resistivity (Ohm-cm) |
|---|---|---|---|---|
| 1 | GMF5C/E300 | 500 | 1700 | 7.5E+09 |
| 2 | GMF5C/E300 | 200 | 1700 | 1.5E+03 |
| 3 | GMF5C/E300 | 75 | 1700 | 7.4E+00 |
| 4 | GMF5C/E300 | 500 | 1850 | 1.0E+07 |
| 5 | GMF5C/E300 | 200 | 1850 | 3.6E+08 |
| 6 | GMF5C/E300 | 75 | 1850 | 3.0E+07 |
| 7 | GMF5C/E300 | 500 | 1910 | 9.0E+06 |
| 8 | GMF5C/E300 | 200 | 1910 | 3.0E+09 |
| 9 | GMF5C/E300 | 75 | 1910 | 2.2E+06 |
| 10 | GMF5C/E300 | 500 | 2150 | 6.1E+06 |
| 11 | GMF5C/E300 | 200 | 2150 | 1.1E+08 |
| 12 | GMF5C/E300 | 75 | 2150 | 8.7E+07 |

Samples 1-12 are formed according to embodiments provided herein. That is, a slurry is formed using water and a mixture of fine-grained and coarse-grained silicon carbide particles. The dry mixture of silicon carbide particles also included different percentages of $B_4C$ powder, which is added to provide the appropriate boron dopant levels. Samples having a boron dopant level of 500 ppm include approximately 0.06 wt % $B_4C$ within the original dry mixture. The samples having a boron dopant level of 200 ppm include approximately 0.03 wt % $B_4C$ within the original dry mixture. Samples having a boron dopant level of 75 ppm include approximately 0.01 wt % $B_4C$ within the original dry mixture.

Each of the Samples 1-12 are slip cast to form green samples having an average thickness of 50 mm. Notably, Samples 1-12 have thicknesses that are greater than the samples formed in Example 1. The green articles are heated to a sublimation/recrystallization temperature to form recrystallized silicon carbide samples. The sublimation/recrystallization temperatures for each of the Samples 1-12 is between 1700° C. and about 2150° C. and the samples are held at this temperature for 180 minutes. Notably, each of the Samples 1-12 are heated in a reduced pressure atmosphere, having a pressure of 6 Torr. No inert gas is flowed through the chamber. Samples 1-12 generally have a porosity of 15 to 20 vol %.

Table 2 illustrates a relationship between the dopant level and the heating temperature. At a temperature of 1700° C., Sample 1 containing a boron content of 500 ppm, has a high resistivity (>1E5 Ω cm at 300K). However, Samples 2 and 3 having a boron content of 200 ppm and 75 ppm respectively, do not have a high resistivity. Still, as further demonstrated in Table 2, the Inventors discovered that in combination with particular materials and process parameters, an increase in temperature can provide a high resistivity recrystallized silicon carbide body using a lower boron content. For example, at a heating temperature of 1850° C. and a boron content of 75 ppm, a recrystallized silicon carbide body having a resistivity of 3E7 Ω cm is formed. Moreover, similar high resistivity recrystallized silicon carbide bodies were obtained with low levels of boron content (e.g., 75 ppm) at heating temperatures greater than 1850° C. Accordingly, Table 2 illustrates that high resistivity, recrystallized silicon carbide bodies having thick cross sections can be formed using minor levels of boron.

The recrystallized silicon carbide articles described herein are suitable for use in the electronics industry, particularly in manufacturing electronic components. The recrystallized silicon carbide bodies described herein include particular features, such as electrical resistivity, mechanical properties, and purity (i.e., low levels of potentially contaminating elements) that facilitates their use in single wafer processing applications.

While silicon carbide articles have been formed that are capable of having high resistivities, typically such bodies are sintered bodies, have high densities requiring high sintering temperatures, and are susceptible to high shrinkage rates during fabrication. The particular articles and processes disclosed herein enable recrystallized silicon carbide articles having high resistivities. The present articles and processes enable the formation of particular recrystallized silicon carbide bodies exhibiting a departure from the state of the art, within the context of recrystallized silicon carbide articles. Moreover, the presently disclosed ReSiC bodies incorporate a combination of features including, particular boron contents or nitrogen contents, volume resistivities, linear shrinkage, average grain size, porosity, MOR, MOE, CTE, overlying layers, and dimensions. Notably, the processes disclosed herein incorporate a combination of features including particular ratios of fine and coarse SiC particles, particular particle sizes of the fine and coarse SiC particles, and a heating process which can include a particular environment (i.e., reduced pressure, nitrogen partial pressures, and flow of an inert gas), sublimation temperatures, and duration.

According to one embodiment, particular combinations of features facilitate formation of ReSiC bodies having reduced levels of boron that previous to now, have been insufficient to form high resistivity ReSiC bodies. Boron content reduction while achieving increased resistivity is of notable significance, as boron can be considered an impurity in wafer processing. Such high resistivity ReSiC bodies may be incorporated into SWP platforms to provide components such as substrates, wafer holders, and other furniture, which is more suitable for high-temperature, corrosive environment processing as compared to those materials currently used.

According to another embodiment, it has been discovered that reduced levels of nitrogen manifest a surprising spike (increase) in resistivity in the context of ReSiC bodies. While nitrogen is understood to be functionally linked to resistivity, it has been found that unexpectedly high resistivity can be achieved through nitrogen reduction in ReSiC bodies. While not wishing to be tied to a particular theory, it is believed that combinations of different grain sizes causes different nitrogen levels within the SiC grains. As a result, preferential nitrogen extraction from the fine SiC grains between the coarse SiC grains can occur under particular processing conditions, leading to localized increases in resistivity within the recrystallized SiC grains, particularly at the grain boundaries, thereby forming a ReSiC article having an overall high resistivity. Accordingly, high resistivity ReSiC bodies with low nitrogen content are suitable for high-temperature, corrosive environment processing as compared to those materials currently used, and may be incorporated into SWP platforms to provide components such as substrates, wafer holders, and other furniture.

While the invention has been illustrated and described in the context of specific embodiments, it is not intended to be limited to the details shown, since various modifications and substitutions can be made without departing in any way from the scope of the present invention. For example, additional or equivalent substitutes can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:

1. A recrystallized silicon carbide body comprising:
   a resistivity of not less than about $1\text{E}5\ \Omega\ \text{cm}$; and
   a nitrogen content of nitrogen atoms bonded within the body, wherein the nitrogen content is not greater than about 200 ppm.

2. The recrystallized silicon carbide body of claim 1, wherein the resistivity is not less than about $1\text{E}6\ \Omega\ \text{cm}$.

3. The recrystallized silicon carbide body of claim 1, wherein the body is polycrystalline comprising grains having an average grain size of not less than about 0.5 microns.

4. The recrystallized silicon carbide body of claim 1, wherein the body comprises a porosity of not less than about 5 vol %.

5. The recrystallized silicon carbide body of claim 1, wherein the nitrogen content is not greater than about 150 ppm.

6. The recrystallized silicon carbide body of claim 1, wherein the body comprises a density of not greater than about 2.9 g/cc.

7. The recrystallized silicon carbide body of claim 1, further comprising a surface portion overlying at least a portion of the body.

8. The recrystallized silicon carbide body of claim 7, wherein the surface portion comprises silicon carbide.

* * * * *